United States Patent [19]

Finot

[11] Patent Number: 4,592,298

[45] Date of Patent: Jun. 3, 1986

[54] PROPULSION SYSTEM FOR SAILING CRAFTS AND SHIPS

[75] Inventor: Jean-Marie Finot, Jouy en Josas, France

[73] Assignee: Groupe Finot, Jouy en Josas, France

[21] Appl. No.: 746,930

[22] Filed: Jun. 20, 1985

Related U.S. Application Data

[63] Continuation of Ser. No. 459,040, Jan. 17, 1983, abandoned.

[30] Foreign Application Priority Data

Jan. 19, 1982 [FR] France ............................. 82 00743

[51] Int. Cl.⁴ ............................................. B63H 9/04
[52] U.S. Cl. ..................................... 114/39; 114/126; 114/274
[58] Field of Search ................ 114/39, 123, 126, 274; 244/2, 105

[56] References Cited

U.S. PATENT DOCUMENTS

| | | |
|---|---|---|
| 3,295,487 | 1/1967 | Smith . |
| 3,800,724 | 4/1974 | Tracy .................................. 114/39 |
| 3,966,143 | 3/1976 | Smith .................................. 114/39 |
| 3,987,982 | 10/1976 | Amick ................................. 114/39 |

FOREIGN PATENT DOCUMENTS 1484739  6/1967  France ................................ 114/39

Primary Examiner—Sherman D. Basinger
Assistant Examiner—Thomas J. Brahan
Attorney, Agent, or Firm—Wenderoth, Lind & Ponack

[57] ABSTRACT

A propulsion system for crafts and ships, notably sailing ships, includes at least one flexible or rigid sail, to which are attached one or several foils, eventually provided with small floats, whereby the foils can be eventually articulated relative to the sail, so that the pair constituted by the sail and the foils forms a unitary block which allows cancelling a capsizing torque acting on the craft.

11 Claims, 32 Drawing Figures

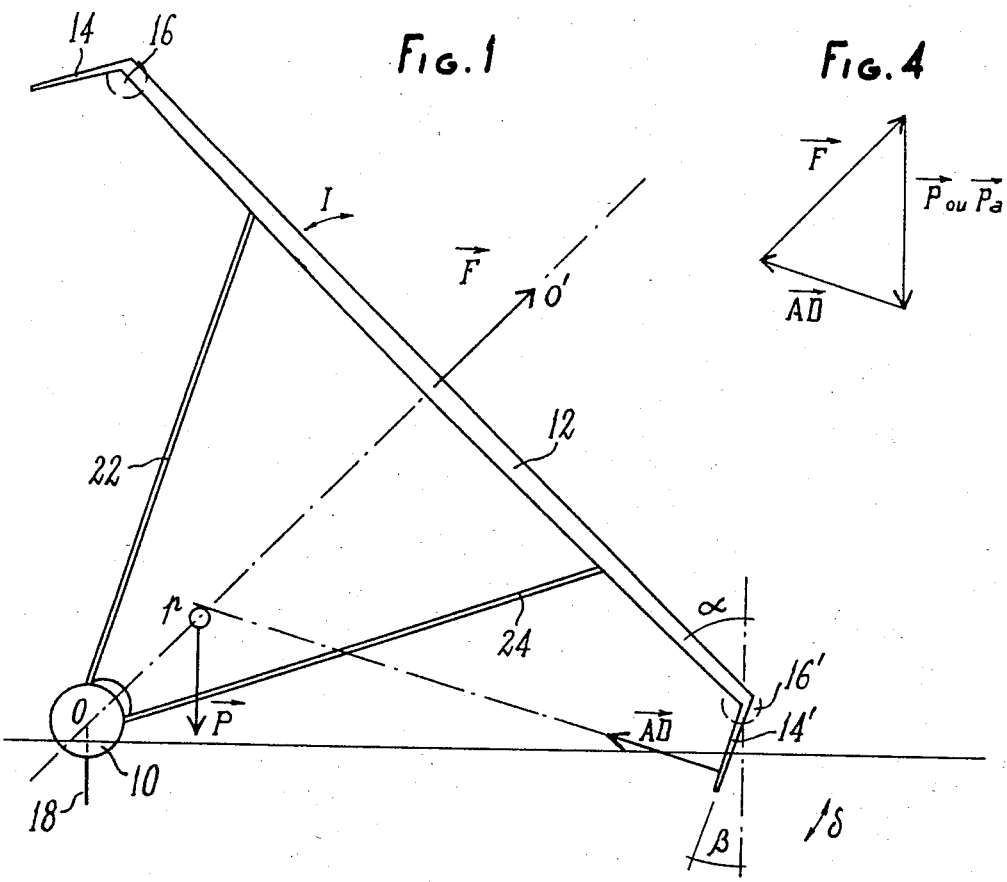
Fig. 1
Fig. 4
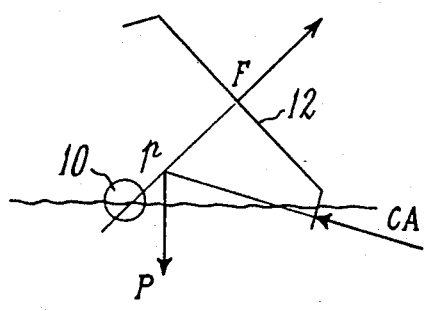
Fig. 5
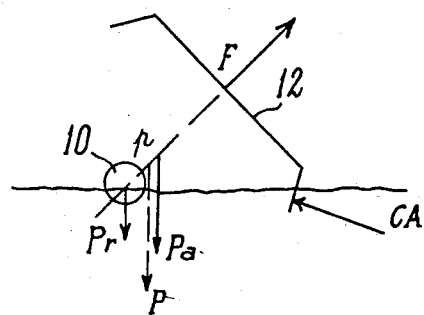
Fig. 6

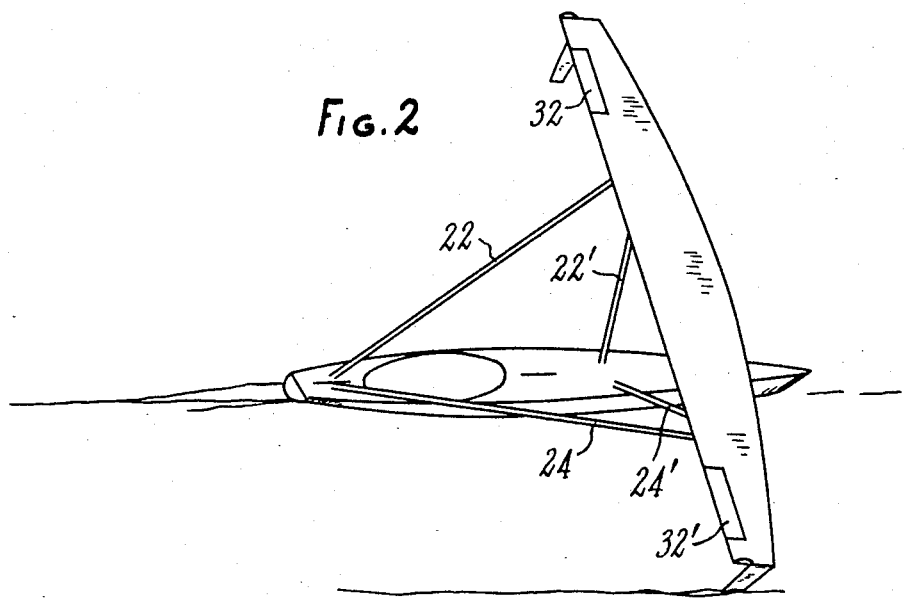
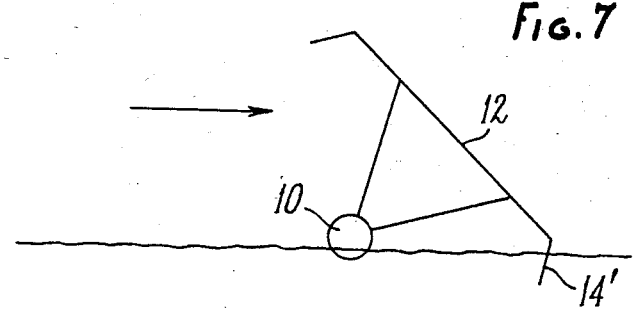
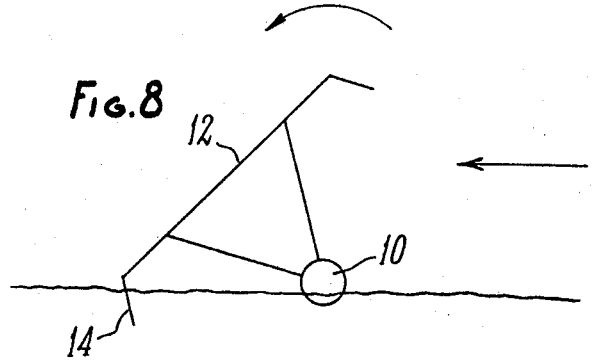

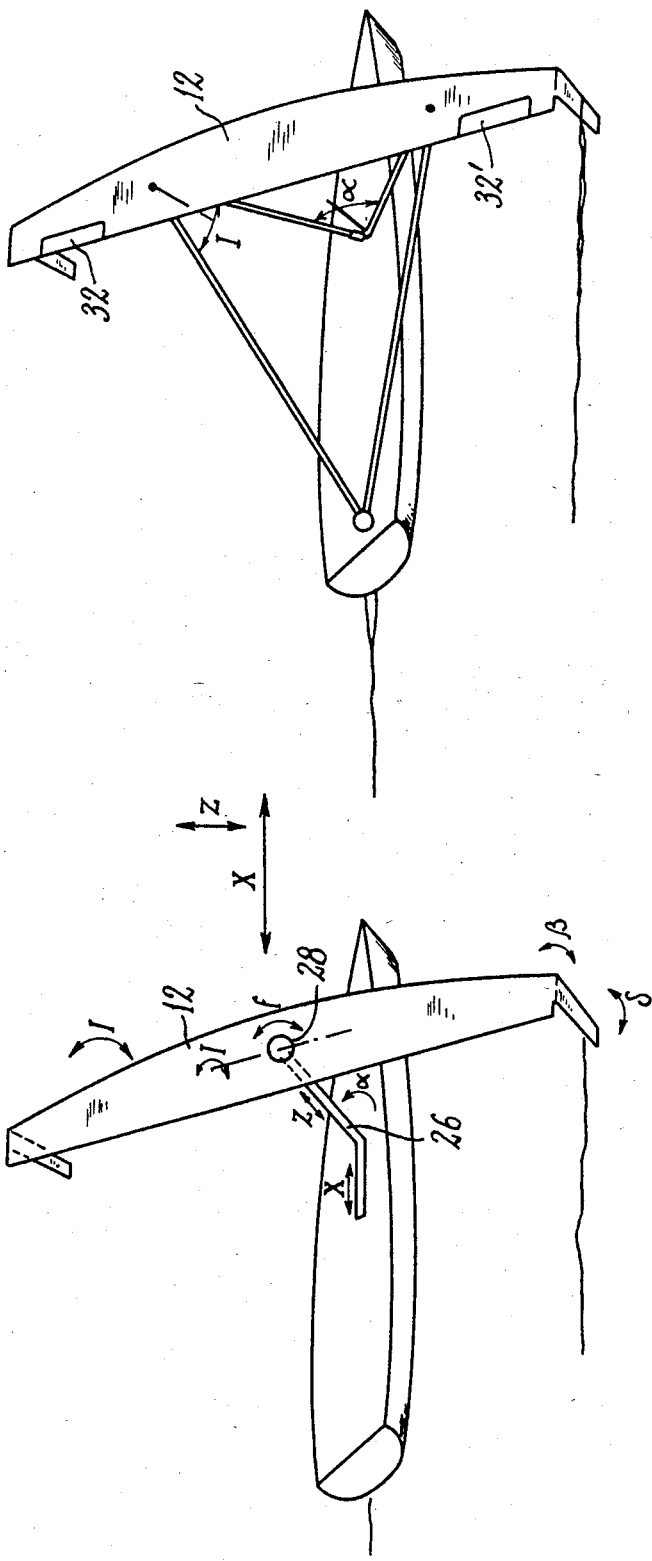

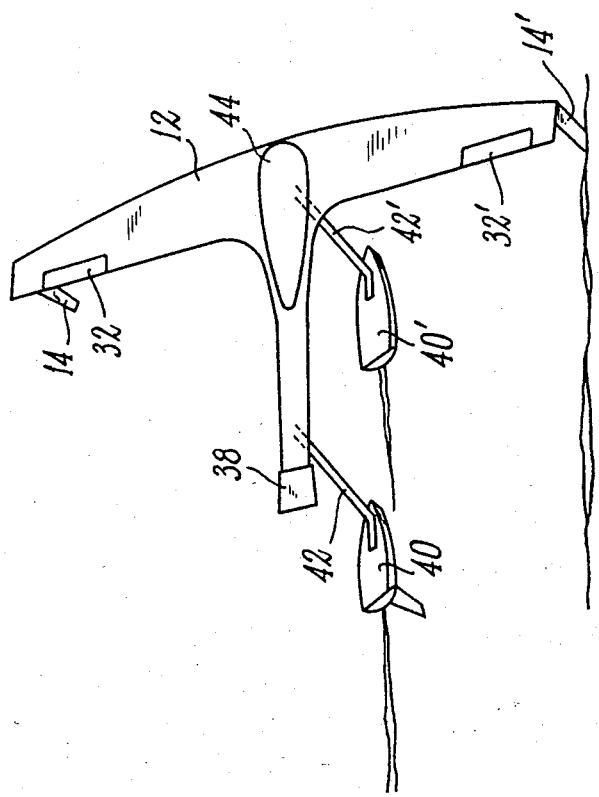
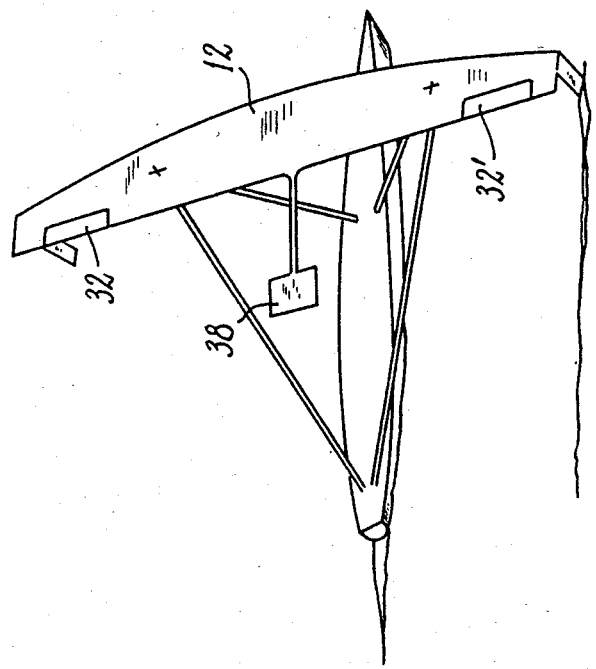

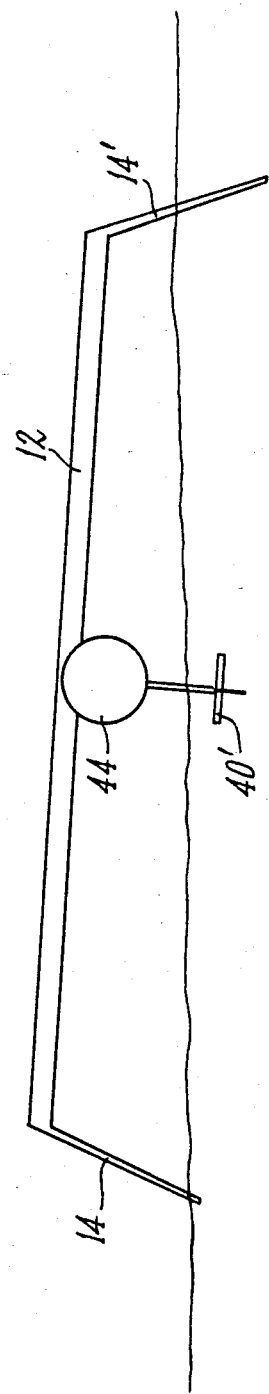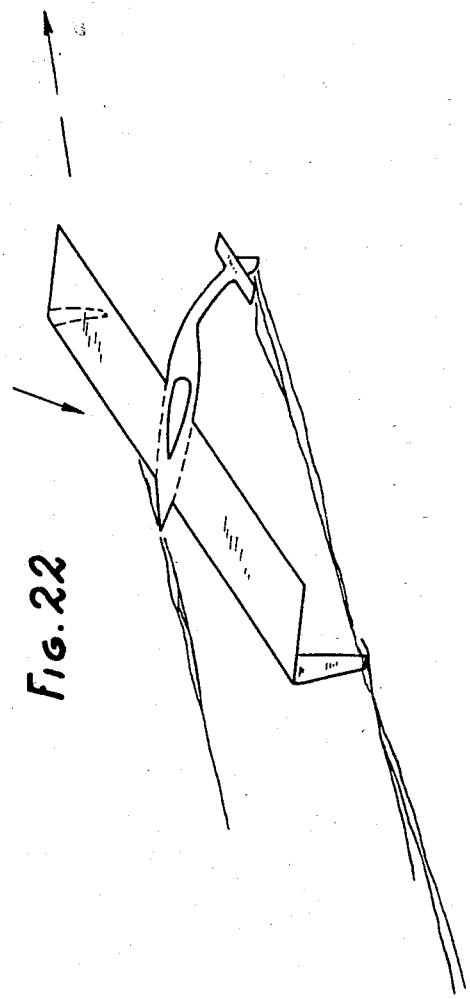

PROPULSION SYSTEM FOR SAILING CRAFTS AND SHIPS

This is a continuation of application Ser. No. 459,040, filed Jan. 17, 1983, now abandoned.

FIELD OF THE INVENTION

The present invention relates to a propulsion system for sailing crafts and ships.

OBJECTS AND SUMMARY OF THE INVENTION

The propulsion system according to the invention is substantially characterized in that it comprises a sail, which can be flexible or rigid, to which are attached one or several hydro-carrier planes or "foils" which can be eventually articulated with respect to the sail, so that the sail surface/anti-drift plane pair thus realized forms a unitary block acting to cancel a capsizing torque, the sail and foil assembly being mounted on the float of the craft or on the hull of the ship via one or several masts or connecting rods, which can be articulated with respect to the hull or float, and/or with respect to the sail.

According to an embodiment of the invention, the sail surface and foil assembly is rigidly connected to the hull or float, and the hull tilts with the assembly during tacking.

According to a second embodiment of the invention, the sail surface and foils assembly is articulated with respect to the hull or float which during tacking, remains horizontal, the sail surface and foil assembly tilting alone with respect to the hull or the float.

According to a feature of the present invention, the sail surface and foil assembly is held by a single mast which transmits motion, and in which are mounted the controls for tilting the assembly.

According to a further characteristic of this invention, there are provided flaps on each trailing edge of the sail, in order to use the aerodynamic force for causing tilting of the sail. One or several aerodynamic rudders can be provided to control and check the incidence of the sail surface.

According to a particular application of the invention, the sail surface and foil assembly can be used as an auxiliary propeller for a sailing or motor ship by mounting it at the rear of the ship in the manner of an outboard motor, by using a small mast articulated at the stern of the ship.

According to another application aimed at the propulsion of cargo boats, several sail surface and foil assemblies are grouped one behind the other, and means are provided for folding them down on the deck of the ship.

According to the invention, manual controls are provided, which can be replaced or completed by electrical, hydraulic or pneumatic control systems, with the possible assistance of processors.

BRIEF DESCRIPTION OF THE DRAWINGS

Further characteristics and advantages of this invention will become more apparent from the following description with reference to the accompanying drawings which illustrate various embodiments and modes of application, without limiting the scope of the invention.

In the drawings:

FIG. 1 is an end schematic view of a floating craft provided with a propulsion system according to the invention;

FIG. 2 is a perspective view of a floating craft according to FIG. 1;

FIGS. 4 through 6 are schematic diagrams provided for the understanding of operation the propulsion system according to the invention;

FIGS. 7 and 8 are schematic views showing the floating craft according to FIGS. 1 through 3, seen from the end, respectively on the port tacks and on the starboard tacks;

FIG. 14 is a perspective view showing another alternative embodiment of the invention where the sail surface is held at a single point where all the mechanical controls are assembled together;

FIG. 15 is a perspective view of another embodiment of the invention wherein the tilting of the sail surface and foil assembly is provided by flaps;

FIG. 16 is a perspective view showing an alternative embodiment in which the incidence of the sail is under the influence of a foil;

FIG. 17 is a perspective view showing an alternative embodiment comprising several floats;

FIGS. 21 through 23 are respectively end, perspective and top views of the position of the sail surface when the wind is very strong;

DETAILED DESCRIPTION OF THE INVENTION

Figure 3:
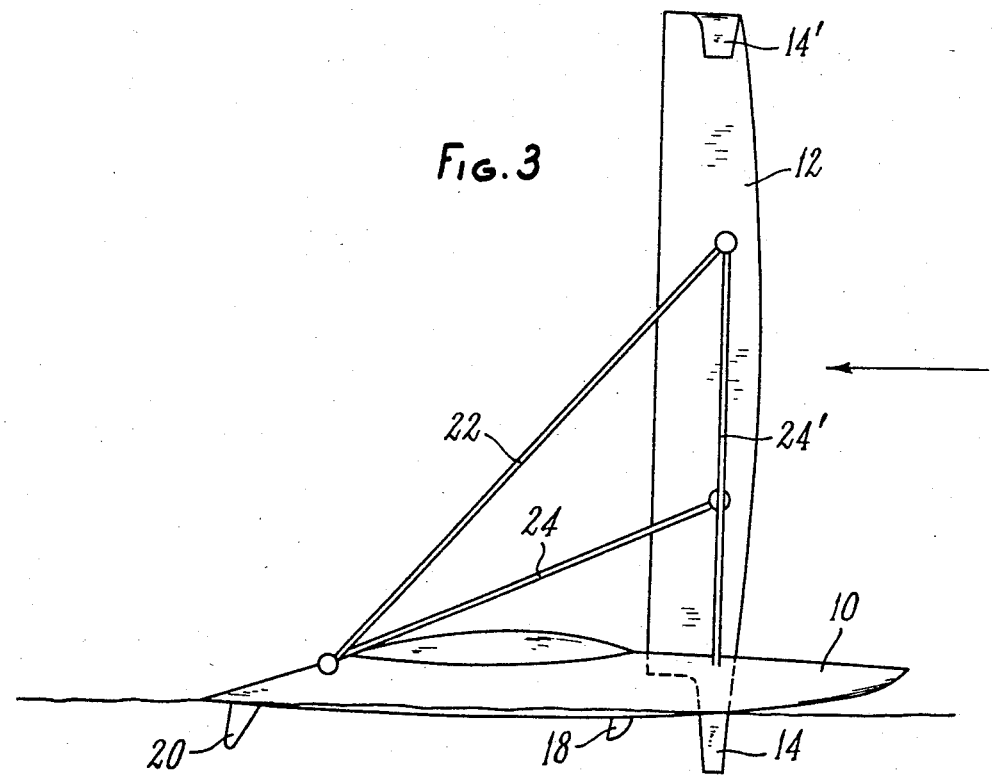
FIG. 3 is a side elevation view of the floating craft according to FIGS. 1 and 2, shown on the starboard tacks (sail tilted to the left)
Figure 9:
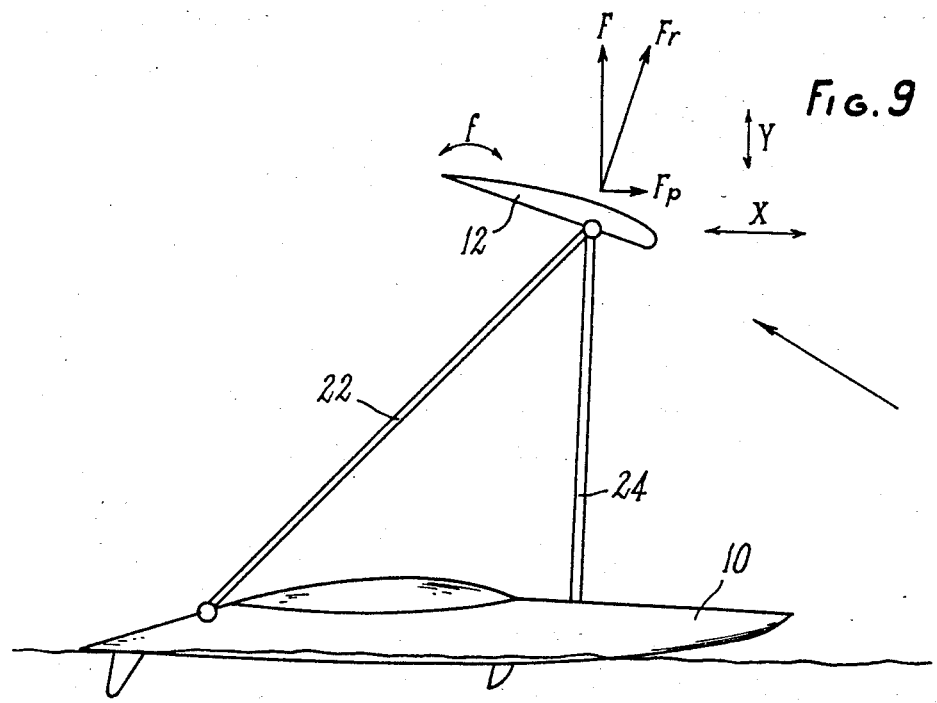
FIG. 9 is a view of the floating craft according to FIG. 1, shown in cross-section in a plane perpendicular to the sail surface.
Figure 10:
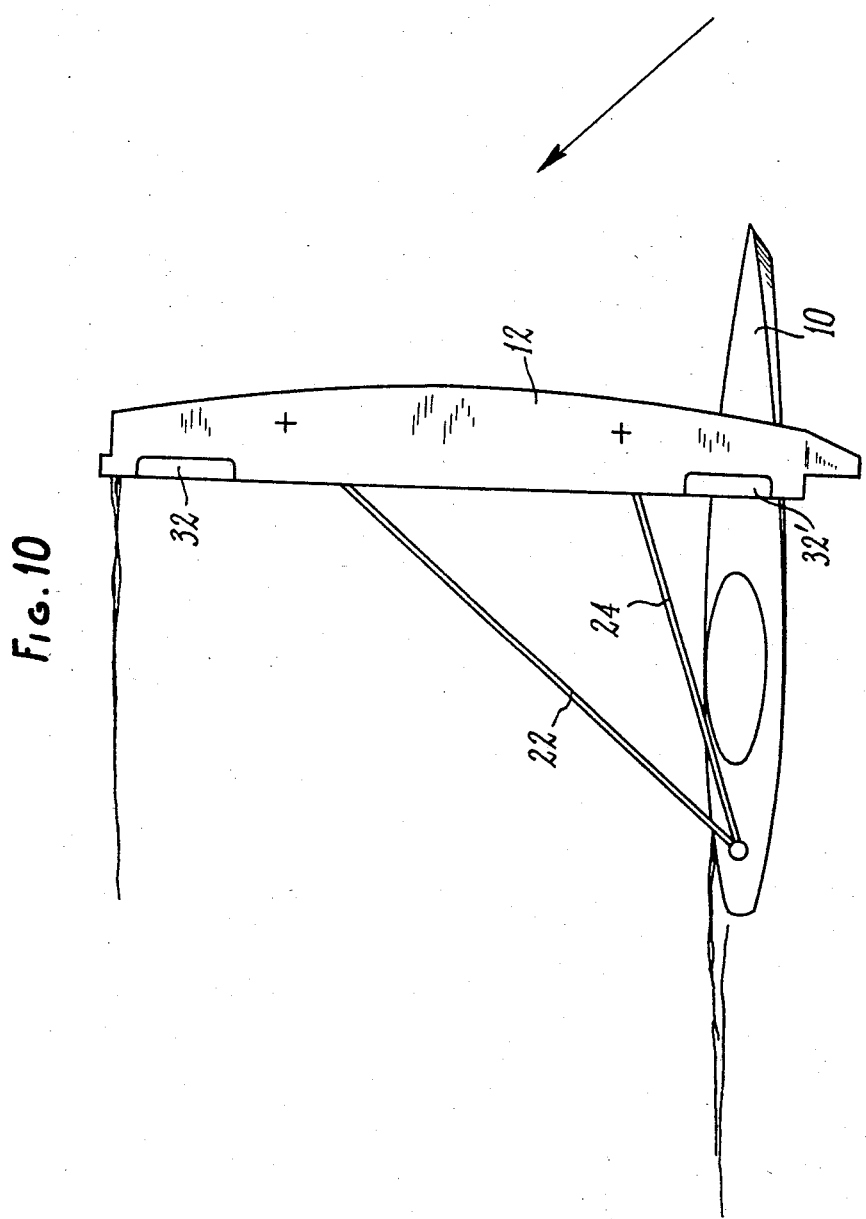
FIG. 10 is a top view of the craft, on the starboard tacks.
Figure 11:
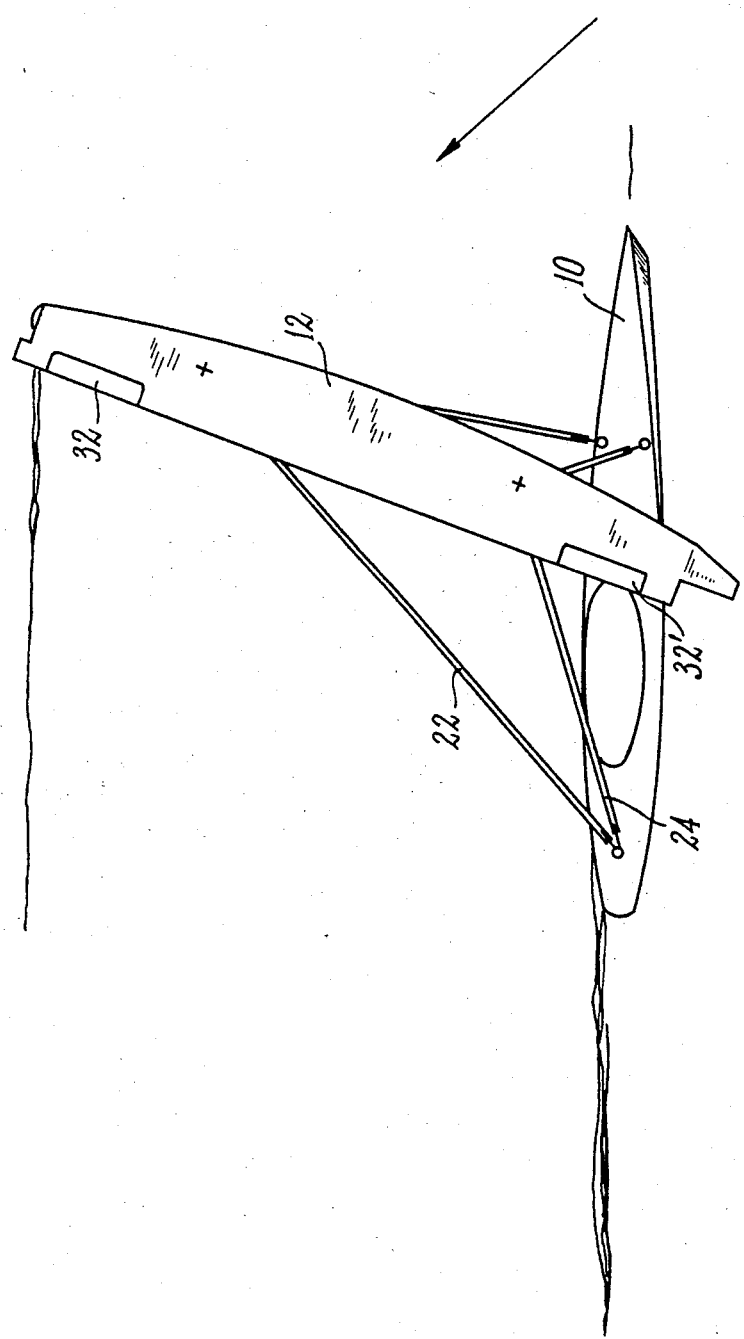
FIG. 11 is a top view of the craft according the invention, with the sail oriented with a sweepback angle inclined to the front.

As made clear hereabove, the propulsion system according to the invention is substantially comprised of a flexible or rigid sail to which are attached one or several hydro-carrier planes, generally called "foils", the design of this novel system being such as to permit cancelling the capsizing torque of a boat, which always sets a limit to the aptitude of a boat to carry a determined sail surface. Due to the invention, a lift and a propelling force is created, which is applied to a virtual or real fixation point on the ship, the limit of which is only determined by the weight of the floating craft or of the ship thus equipped.

Reference is first made to FIGS. 1 through 6 which relate to a floating craft provided with a propulsion system according to the invention. In this case, it is an embodiment relating to a pure speed craft. The propulsion system comprises a rigid sail surface 12 in the form of a wing, at the ends of which are fixed hydro-carrier planes or "foils", articulated or not, 14, 14', with eventually auxiliary floats 16—16'. In this embodiment, the propulsion system is mounted on a shell or main float 10 via a connecting rod assembly 22—22', 24—24', including rods paired two by two at the front and at the rear of the float (FIGS. 2 and 3), on the sail surface 12, substantially on the centre of pressure.

The float 10 includes one or several centre-boards or keels, such as 18, and a rudder 20.

The sail surface 12 is inclined transversely relative to the vertical, at to an angle $\hat{a}$, and according to a horizontal incidence $\hat{I}$. The foil 14' in action is also inclined with respect to the vertical at an angle $\hat{\beta}$ and an incidence $\hat{\delta}$. The angles $\alpha$, $\beta$, and $I$, $\delta$ are determined such that the propulsive force $\vec{F}$ of the sail surface (FIGS. 4 through 6) and the force $\vec{AD}$ exerted on the foil 14' by the thrust CA converge in the vicinity of the center of gravity p of the boat, that is of the assembly formed by the propulsion system and the float ($\alpha$, $\beta$), and that the resultant $\vec{P}$ of the force on the drift and on the propulsion system be vertical ($I$, $\delta$). In this way, no capsizing torque is exerted on the float 10.

The conjunction of forces $\vec{F}$, $\vec{AD}$, $\vec{P}$, and their dynamic equilibrium, obtained by the respective situation and orientation of the float 10, of the sail surface 12 and of the foils 14—14' are the base proper of the propulsion system according to the invention. Therefore, the propulsion system provides, on a real or virtual fixation point, a vertical resultant in the transverse plane (of course independently of its forward propulsive component). When the force $\vec{F}$ which is exerted on the sail surface 12, and the force $\vec{AD}$ which is exerted on the hydro-carried plane 14' in action are not sufficient for counterbalancing the whole of weight P, the forces $\vec{F}$ and $\vec{AD}$ (FIG. 6) counterbalance the portion Pa of weight P, the remnant Pr being counterbalanced by the buoyancy of float 10.

In the embodiment and example of application herein described with reference to FIGS. 1 through 6, the floating craft is dissymmetrical and can only progress on a single board, meaning that it can receive the wind on one side only. In order to receive the wind on the other side (FIGS. 7 and 8), the propulsion assembly tilts and the craft can move foreward on the other board, the sail surface 12 and the foils 14—14' being symmetrical relative to axis 0—0'.

As hereabove described, in the embodiment shown in FIGS. 1 through 11, the propulsion system according to the invention is held by four connecting rods 22—22', 24—24'. The steersman acts on the verticality ($\hat{\beta}$) and on the incidence ($\hat{\delta}$) of the foils 14—14', and he acts on the inclination ($\hat{a}$) and on the incidence ($\hat{I}$) of the sail surface 12. In order to adapt to changes of sailing trim, he acts on the longitudinal (X) and vertical (Z) positions of the sail surface, as well as on its sweepback angle (f), that is the angle of the sail surface with respect to the labber's line of the float. These latter settings are obtained here by chosing the relative length of the connecting rods 22—22', 24—24', or via one or two connecting rods and stays. In the alternative shown in FIG. 14, the same result is obtained with a single mast 26, and this as a function of the size of the propulsive system and of the efforts to which it is subjected. An examination of FIG. 14 shows that the sail surface is held at a single point 28 of the mast, with all the mechanical controls.

Figure 12:
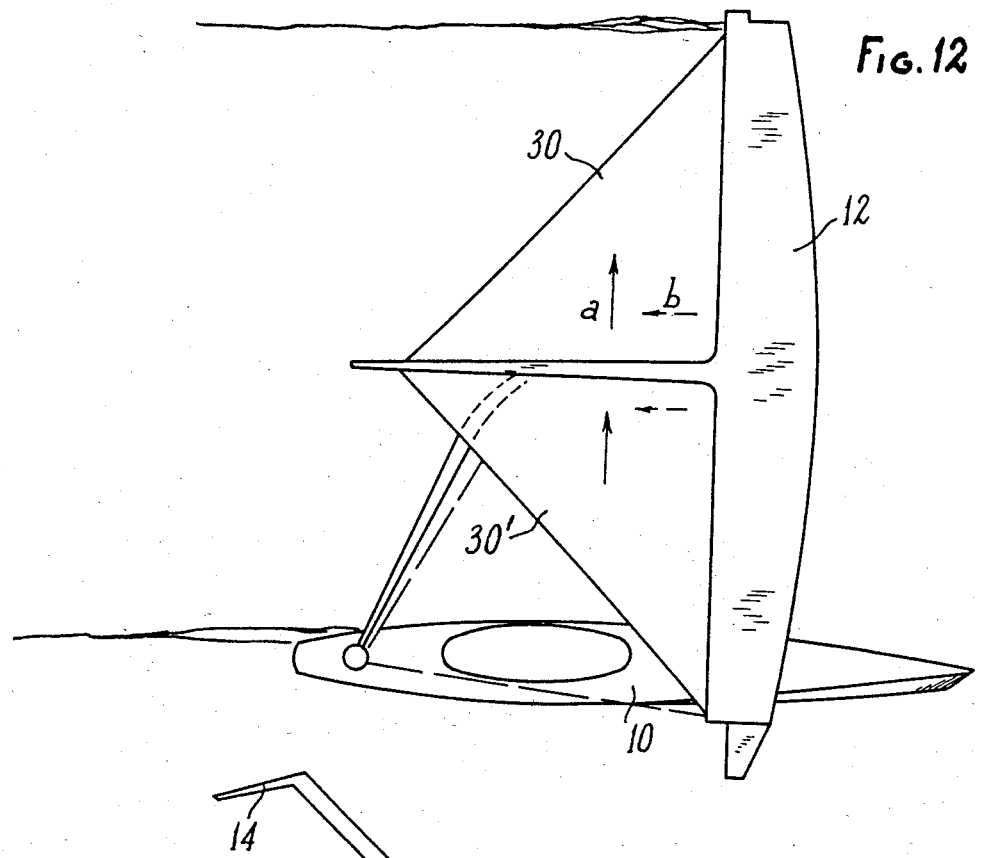
FIG. 12 is a top view of an alternative embodiment according to this invention, comprising extra sails.

When starting, the sail surface is rigid in order to obtain the best efficiency and the best control, and, according to the invention, an extra sail 30—30' (FIG. 12) is then added, at least when the weather is mild, whereby such sail can be unfolded either in a direction b perpendicular to the sail surface 12, or in a direction a longitudinally of said sail surface.

Figure 13:
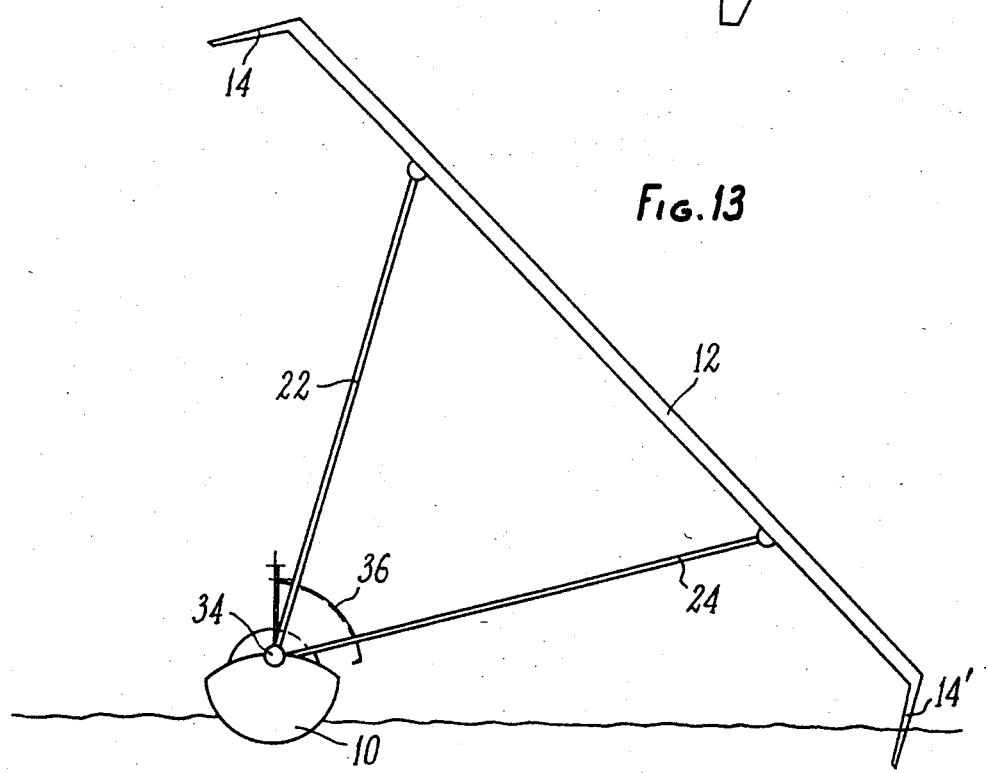
FIG. 13 is a view similar to FIG. 1, showing the alternative embodiment with fixed hull and a sail surface and foil assembly articulated with respect to the hull.
Figure 20:
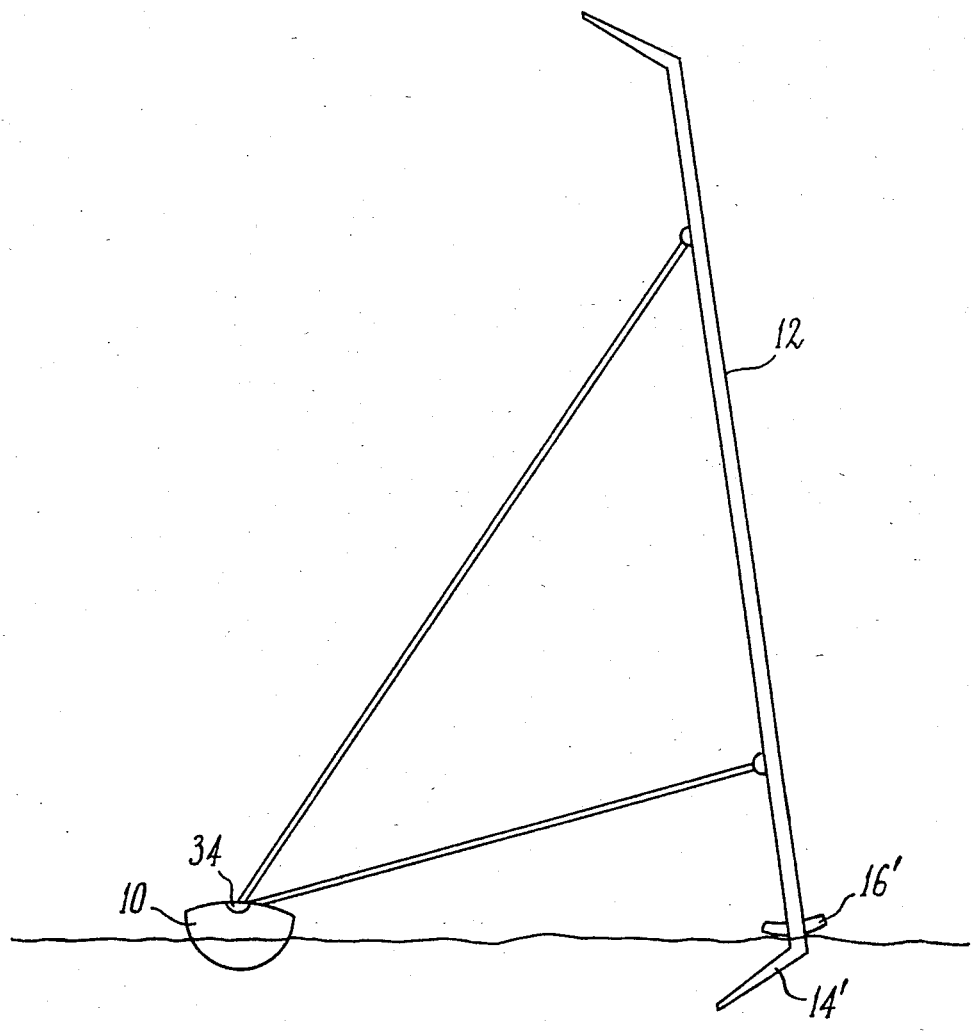
FIG. 20 is an end view showing the position of the propulsion system when the weather is mild.

In the embodiment hereabove described, the sail surface is rigidly connected to the hull of the ship or float of the floating craft, and the hull or float tilts with the propulsion system. Other embodiments can be provided wherein the hull remains fixed and horizontal, the propulsive assembly (sail surface 12 + foils 14—14') tilting with changes of board or according to the settings. This alternative embodiment is shown in FIGS. 13 and 20. One sees that the connecting rods 22—22', 24—24' are articulated about pivots such as 34, a means shown schematically at 36 controls the positioning of the sail surface 12 and of the float 10.

When the craft is heavy, such as shown in FIG. 14, the assembly of controls of the behaviour of the sail surface, and in particular the tilting of the propulsion system, can be purely mechanical. As stated hereabove, the connecting rod system of this embodiment is replaced by a single mast 26, maintaining the sail surface 12 at a single articulation point 28, the controls being grouped in the mast.

When the craft is lighter, it is necessary to use the aerodynamic force for causing the tilting of the sail surface. To this effect, flaps 32—32' (FIGS. 2, 10, 11, 15, 16) are provided. The incidence I of sail surface 12 can also be controlled by using an aerodynamic rudder 38 (FIG. 16). A similar arrangement can also be provided for the foils 14—14'.

It should be noted that the rotation axes for the displacements of the sail surface and of the hydro-carrier planes or "foils" are parallel to the main axes (longitudinal, horizontal, transverse). However, the maneuvering can be made simpler by providing axes which are not horizontal and not parallel to the axis of the floating craft.

The Figures following show various attitudes of the floating craft equipped with the hereabove described propulsion system:

On the starboard tacks: FIGS. 3, 8, 10, 11 (in this Figure, the sail surface is oriented with a sweepback angle f inclined to the front) and 12;
On the port tacks: FIGS. 2, 7, 14 through 16.

Figure 23:
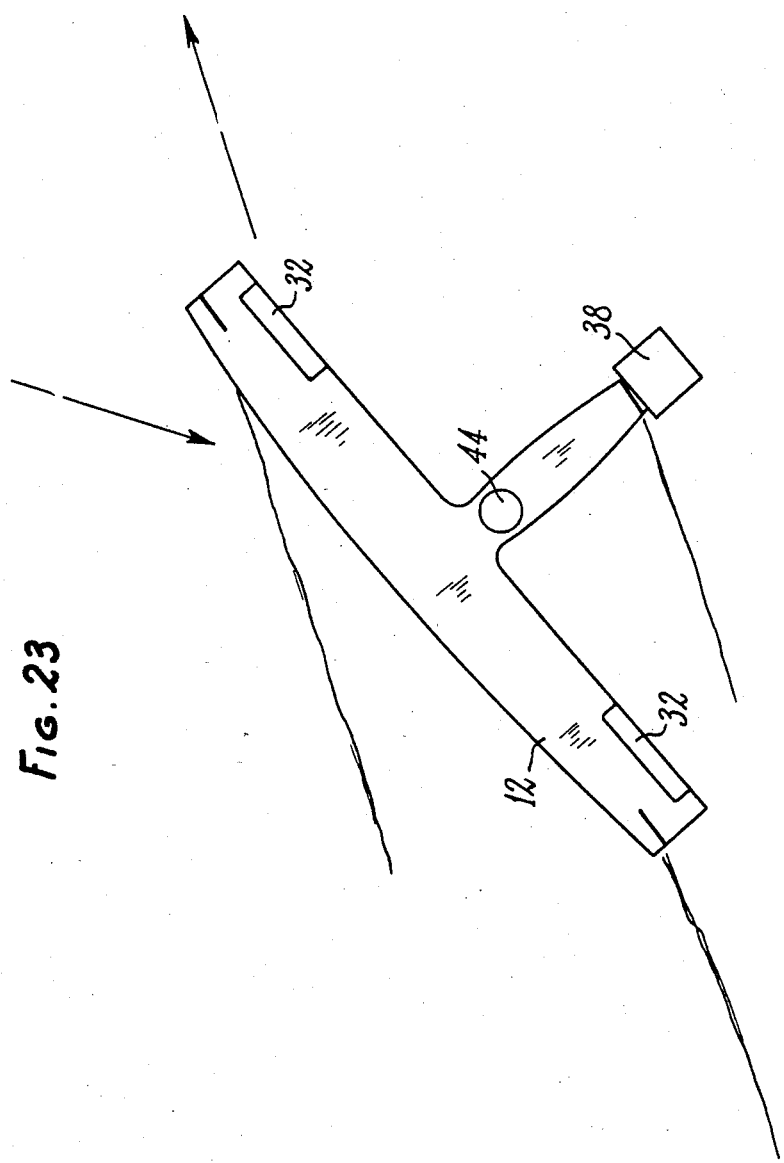

In the alternative shown in FIG. 17, buoyancy is provided by several floats 40, 40', provided with keels and rudders, and possibly with foils, the sail surface being supported by masts such as 42, 42'. The control station 44 is transferred in the sail surface 12, and the floats can be retracted at the level of the control station in order to provide propulsion when the wind is very strong, as hereafter described with reference to FIGS. 21 through 23.

The hereabove described craft corresponds to a craft used when the wind is medium or strong, such weather conditions being those where stability is a problem, but for which the weight is superior to the thrust provided by the sail surface.

When the weather is mild (FIG. 20) and in order to obtain a better efficiency, the sail surface should be positioned vertically, since the is no problem caused by a capsizing torque. One sees that it is particularly under such conditions that the auxiliary floats such as 16' play their part.

When the wind is very strong (FIGS. 21 through 23), the lift which is exerted on the sail surface becomes greater than the weight and it is necessary to tilt the craft more and more, till one of the foils 14, 14' touches the water. At that moment, the craft retracts its floats 40, 40' in order to "float" on the air, the anti-drift surface being at that moment provided by the foils 14, 14' and the rudders of the floats. The attitude of the boat is ensured either by the motions of the foils and the rudder, or by those of the flaps 32, 32' and of the diving rudder 38.

Figure 19:
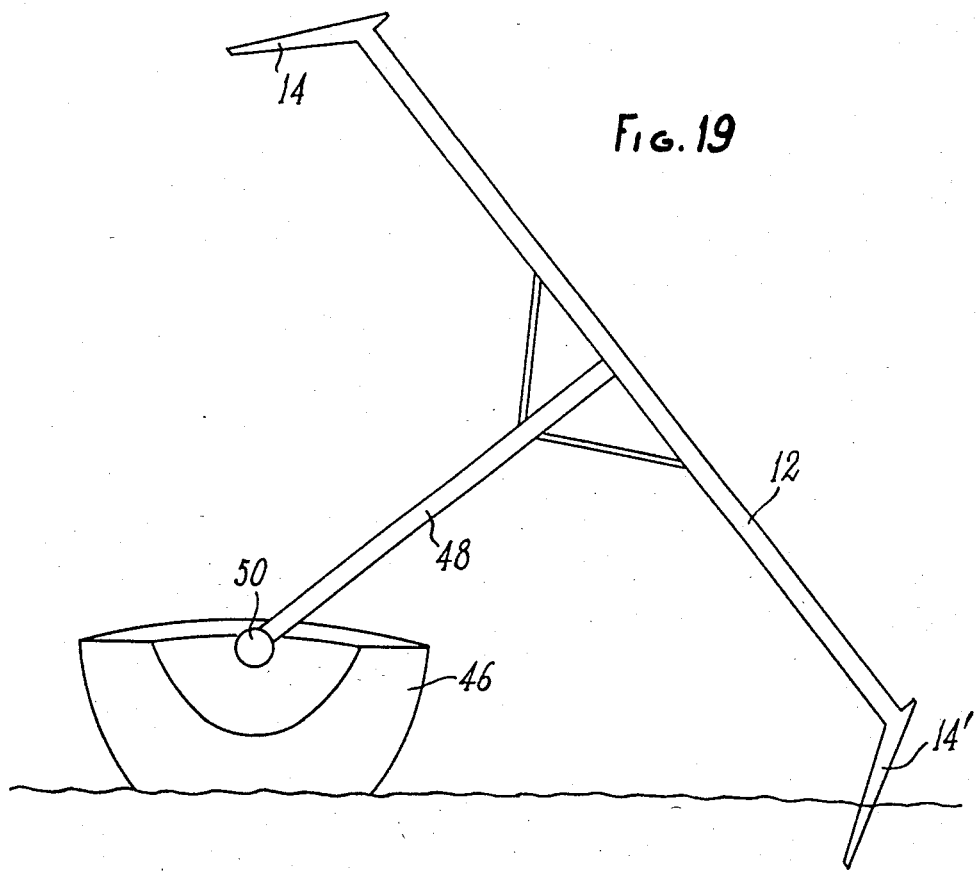
FIGS. 18 and 19 are respectively perspective and end schematic views showing the application of the invention to an auxiliary propulsion system.
Figure 18:
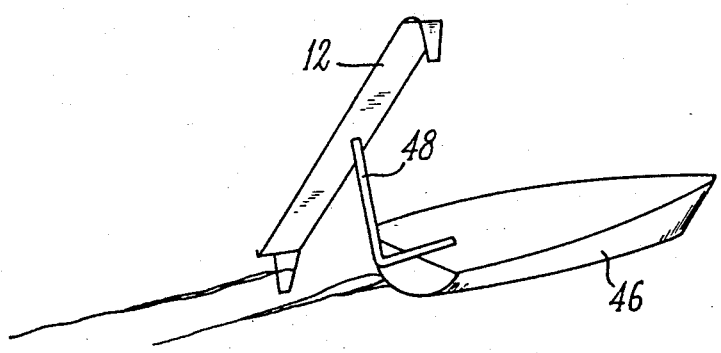

The hereabove described propulsion system can also be used as an auxiliary propeller for a sail or motor boat, in the manner of an outboard motor. This alternative is shown in FIGS. 18 and 19. The sail surface 12, with its foils 14, 14', is mounted on a shaft 48 articulated at 50, at the rear of the boat hull 46.

Figure 24:
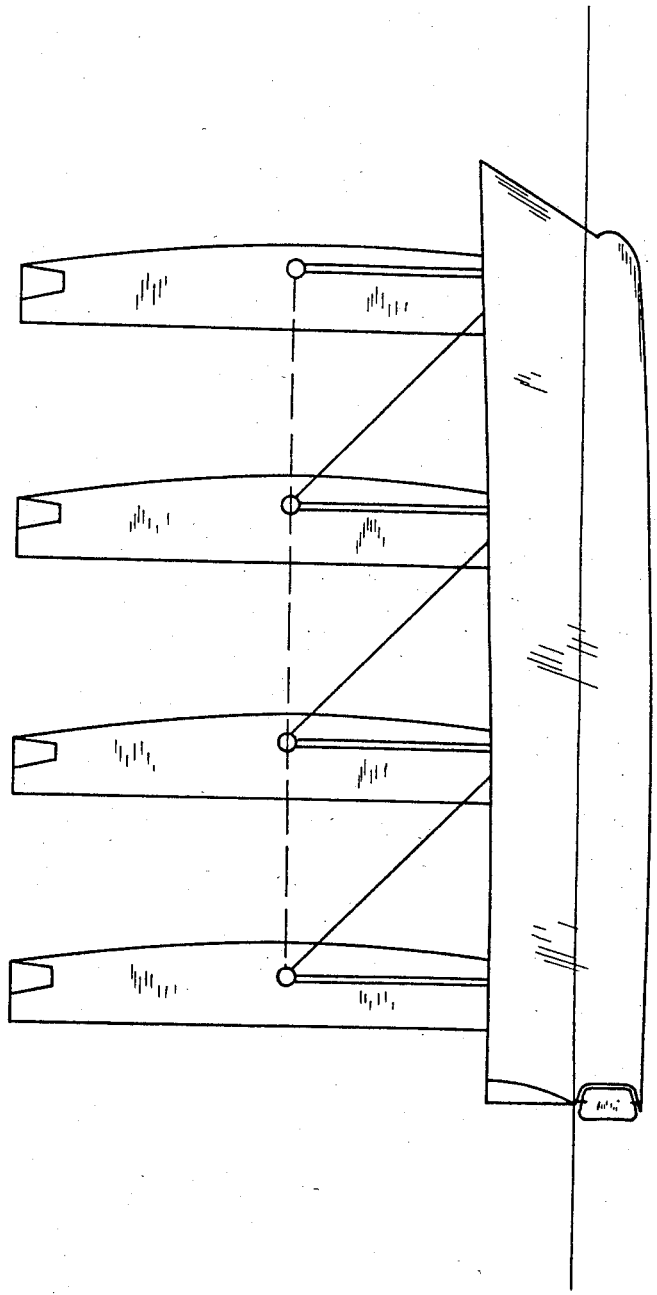
FIG. 24 is a side elevation view of the application of the propulsion system according to the invention to a cargo ship.

The same propulsion system can be used as a propulsion means for cargo boats, by grouping several of them one behind the others. This alternative is shown in FIG. 24. The various sails are mounted on supports which can be folded down, in order to set the system flat on the ship deck.

The hereabove description shows that the propulsive system of the craft according to the invention has many degrees of freedom:
(a) for the sail surface, six degrees of freedom:
  three spatial positionings;
  three positionings in rotation.
(b) for the foils: three rotations.

Figure 25:
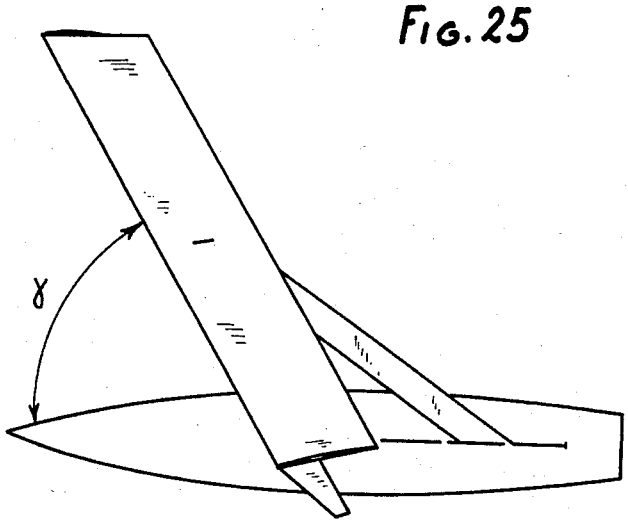
FIGS. 25 and 26 are respectively a top view and a side elevation view of a simplified alternative embodiment of the craft according to the invention.
Figure 26:
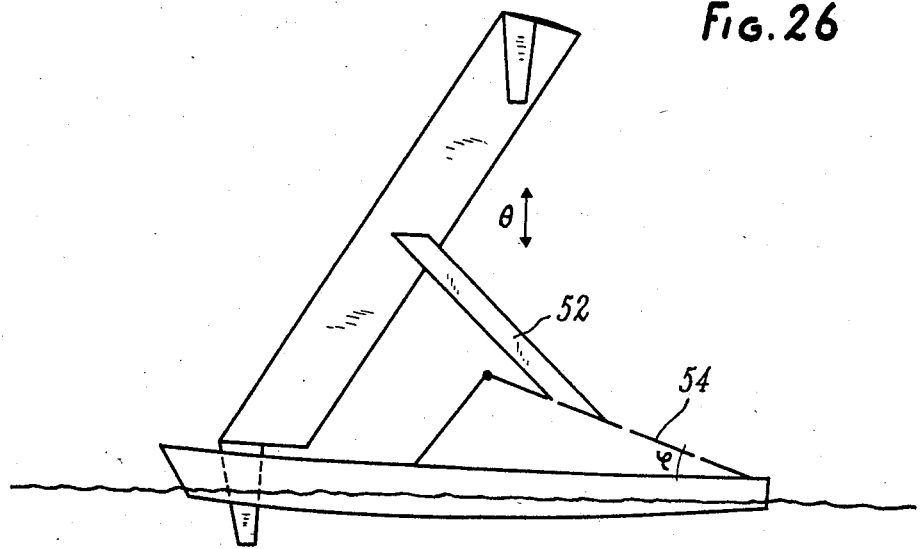

As regards the sail surface, one of the factors is determined automatically by the level of the water. However, the number of degrees of freedom to manage is still high, and this is a reason why there may be provided a simplified alternative (FIGS. 25 and 26) in which the foils and the axis of the sail surface are keyed with respect to the boat (the angle $\hat{\gamma}$ is fixed). The foils+sail surface assembly is mounted on a mast 52 (or several masts) with an orientable profile, which can swing about one axis 54 inclined relative to the horizontal. The single degree of freedom which remains is the incidence of the sail surface relative to the wind (angle $\theta$), and the fact that the sail surface can tilt from one board to the other. In this case, the rotation axis is an axis inclined longitudinally (angle $\phi$) so that the sail remains similar to itself from one board to the other.

It will be remarked that when the craft is stopped, it is necessary to support the sail if one wishes to avoid it dipping into the water, this being obtained:
(a) either because the craft is heavy enough to support the torque of the sail surface;
(b) or by providing small floats at the ends of the sail surface, as hereabove described;
(c) or because it is the volume as such of the end of the sail surface which provides the support of the sail surface. In this alternative (FIGS. 27 and 28) the whole of the wing profile forming the sail surface has to have its end mobile so as to be able to navigate in the water without too much drag.

Figure 27:
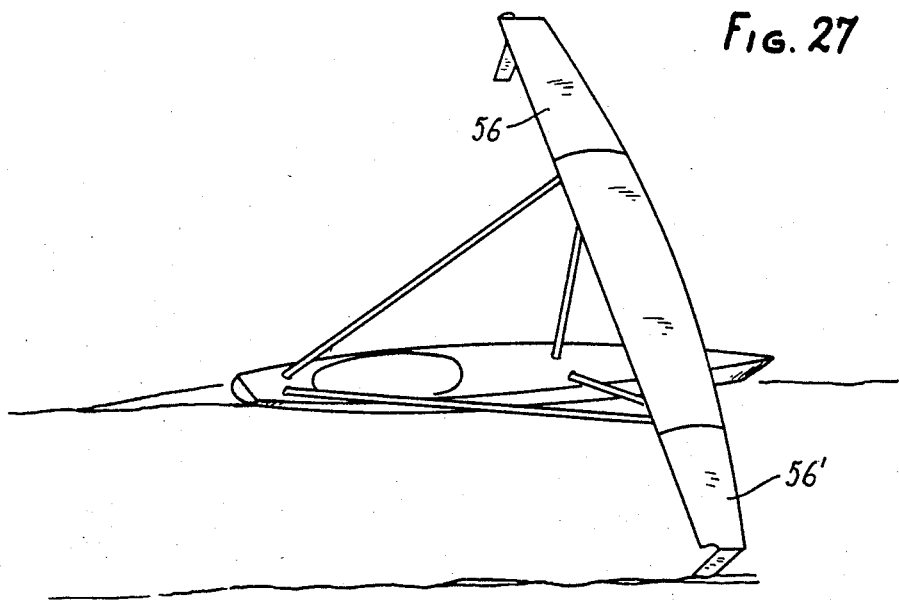
FIGS. 27 and 28 are perspective views from above of another alternative embodiment of the invention comprising a sail surface with mobile elements.
Figure 28:
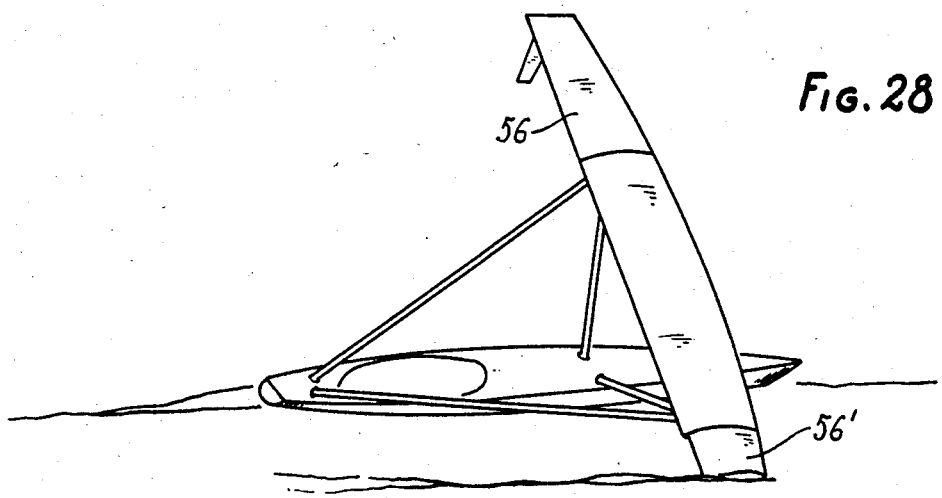

In this alternative shown in FIGS. 27 and 28, the sail surface is formed at its ends with mobile portions 56 and 56' which provide a hydrostatic lift when the craft is stopped or sailing at small speeds, since the two mobile portions can assume an orientation in the displacement axis of the craft. The incidence of the two end mobile portions can also allow creating a differential lift when the wing is completely emerged, in order to play the part of a fin.

Figure 29:
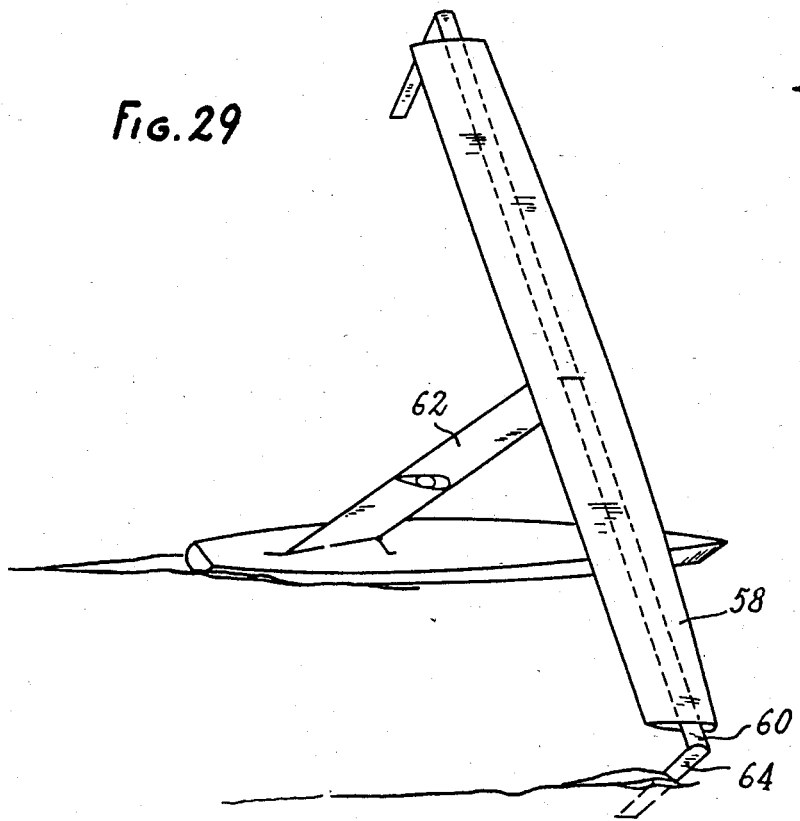
FIG. 29 is a top view of an alternative embodiment, comprising a sail surface articulated about a longeron rigidly connected to the mast and to the foils.
Figure 30:
FIG. 30 is a detail of FIG. 29.

The alternative of the invention which is shown in FIGS. 29 and 30 aims at simplifying the construction of the controls, in the case of a fixedly keyed wing. In this alternative, the sail surface 58 as such is not self-supporting, and the structural function is created by a longeron 60, independent of the sail surface, but rigidly connected to the foils 64 and to the mast 62, the wing or a portion thereof oscillating about the longeron (FIG. 30).

Figure 31:
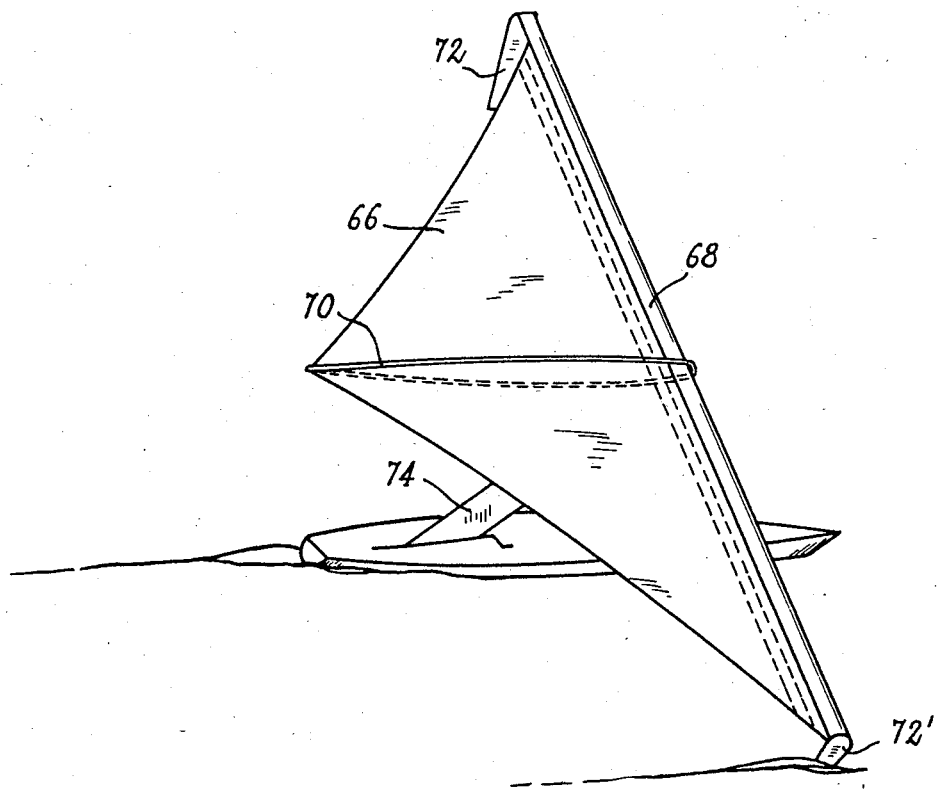
FIG. 31 is a top view of another alternative embodiment of the craft according to the invention, comprising a flexible sail surface.

FIG. 31 illustrates an alternative embodiment in which the sail surface is formed of a flexible fabric 66, held by a supporting longeron 68 and stretched by a spar, such as a wishbone 70. The longeron 68 is provided with foils 72, and the assembly is supported by a mast 74. The flexible sail surface 66 can be possibly wound inside the longeron 68.

Figure 32:
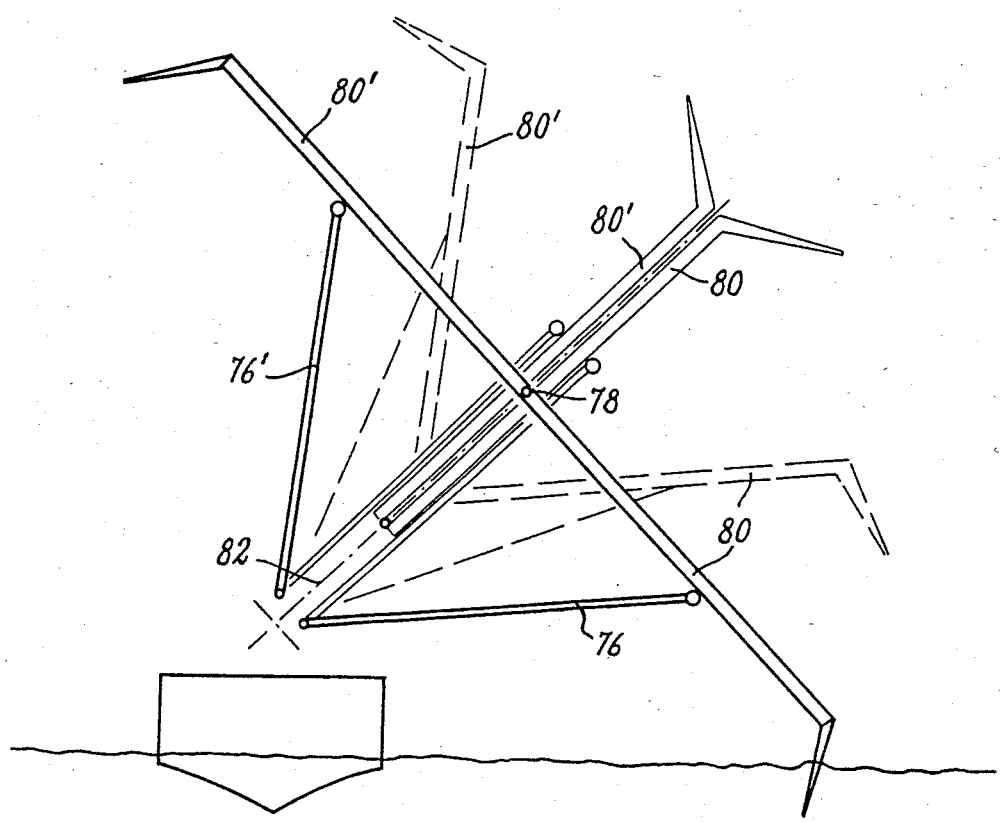
FIG. 32 is an end view showing a craft according to the invention provided with a foldable sail surface.

In order to reduce the space occupied by the sail surface, particularly in a harbour, it is possible to form (FIG. 32) one wing in two portions 80, 80', foldable about a central axis 78, the wing, maintained by two supporting arms 76 and 76', being foldable between the two arms, for example with the assistance of a connecting rod or of a control cable 82. In addition to the features herein described and/or shown, the following extra characteristics can also be foreseen, with a view to improving the running of the craft of the invention:
(a) a fixed or oscillating profiling around the masts in order to reduce the dunnage;
(b) the positioning of the control station in the mast or in the sail surface, also for reducing the dunnage;
(c) the twisting of the foils between the lower portion and the upper portion, in order to take in account an optimalization of the profile as a function of the degree of immersion of the craft in the water and of the speed.

The propulsion system according to the invention can include manual controls, possibly completed by electrical, hydraulic or pneumatic systems, which can be assisted by processors.

It will be noted that while the herein described craft is, in some aspects, close to aeronautics, the propulsion system according to the invention remains substantially nautical, since it draws its energy from the difference in speed, viscosity and density between air and water.

It goes without saying that the present invention is of course not limited to the various embodiments and examples of application herein described, and that it encompasses all its alternatives.

What I claim is:

1. In a sailing ship of the type including a main shell riding in the water and containing a passenger compartment and a sail mounted on the shell for propelling said shell through the water by the force of wind, during which a torque may be applied to said sail tending to capsize said shell, the improvement of means for balancing said torque and for preventing capsizing of said shell, said means comprising a construction wherein:

said sail comprises an elongated wing having mounted directly on opposite ends thereof generally downwardly extending foils;

and comprising means for mounting said wing in an operative sailing position at a level spaced substantially above said shell such that said wing extends generally transversely of said shell, such that said wing is inclined with said foil at one end thereof dragging in the water at an angle inclined toward said shell from the vertical and such that the entire assembly of said wing, said foils and said mounting means are movable as a unit between oppositely inclined positions with respective said foils dragging in the water, said mounting means being fixed to said shell such that said shell moves with said assembly between said oppositely inclined positions thereof;

said ship having a center of gravity at a location between said shell and said wing;

means for adjusting said angle of inclination of the respective said foil in the water and thereby for controlling the degree of lift and immersion thereof; and the inclination of said wing and said angle of inclination of said respective foil in the water being such that the force of the wind acting on said wing and creating said torque is balanced by the weight (P) of said ship and by the counterforce (AD) of the water acting on said respective foil in a direction transverse thereto, with said forces (F) and (AD) converging adjacent said center of gravity.

2. The improvement claimed in claim 1, wherein said mounting means comprise plural connecting rods fastened to said wing and to said shell.

3. The improvement claimed in claim 1, wherein said mounting means comprises a mast mounted on said shell and supporting said wing.

4. The improvement claimed in claim 1, wherein said sail further comprises an extra flexible sail mounted on said wing to be selectively unfoldable therefrom.

5. The improvement claimed in claim 1, wherein said sail further comprises flaps pivotally mounted on the trailing edge of said wing for facilitating movement of said assembly between said oppositely inclined positions thereof.

6. The improvement claimed in claim 1, further comprising aerodynamic rudder means mounted on said wing for controlling the incidence thereof.

7. The improvement claimed in claim 1, wherein said assembly is tiltable about an axis which extends in the longitudinal vertical plane of said shell and which is inclined to the horizontal.

8. The improvement claimed in claim 1, wherein said wing includes movable end portions supporting said foils.

9. The improvement claimed in claim 1, wherein said mounting means comprises a mast fixed to said shell, and said wing includes a transverse longeron fixed to said mast and rigidly mounting said foils and a sail surface articulated about said longeron.

10. The improvement claimed in claim 1, wherein said wing comprises a longeron supporting said foils, and a flexible fabric stretched over said longeron by a plurality of spars.

11. The improvement claimed in claim 1, wherein said wing comprises two portions pivotally mounted about a central position.

* * * * *